Figure 1:
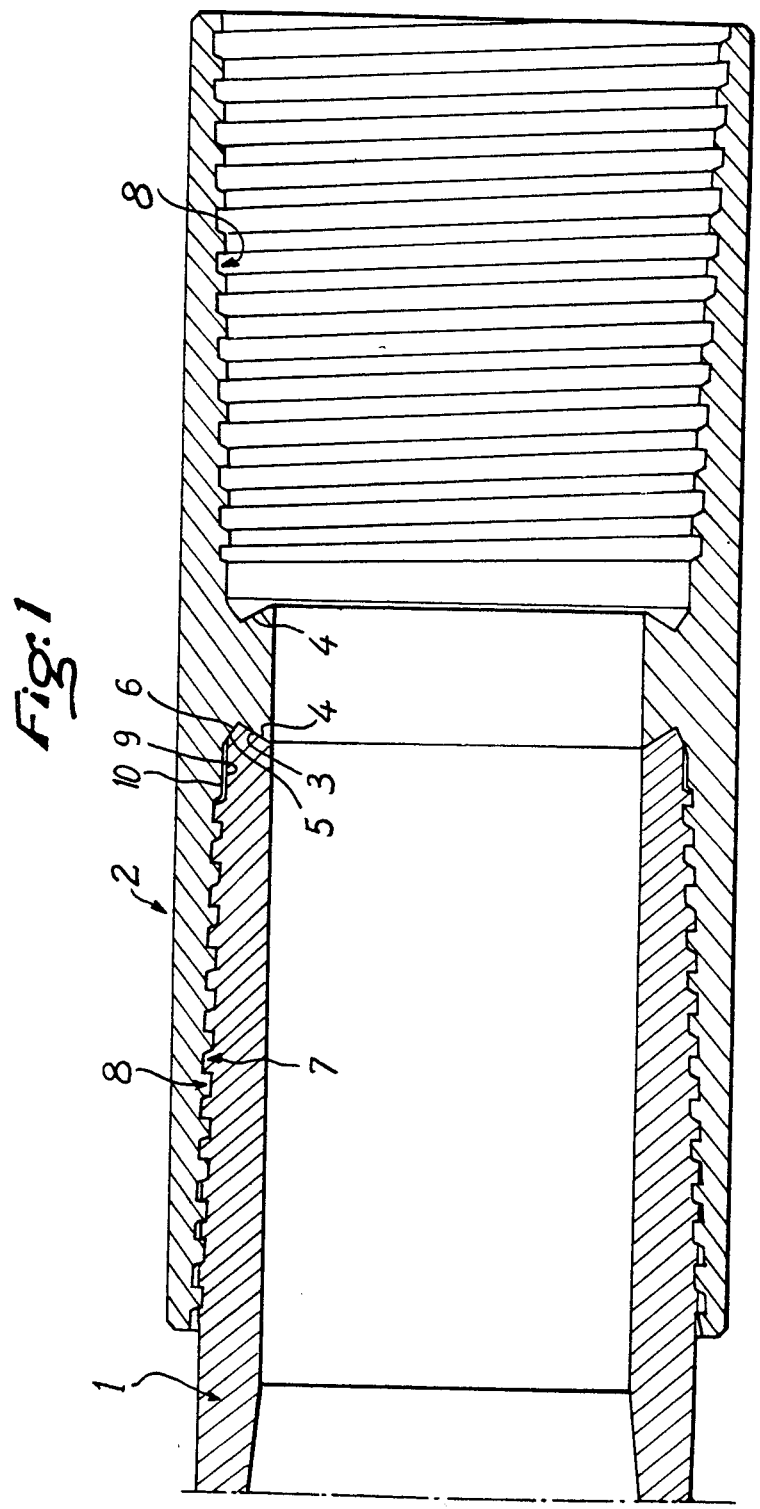

United States Patent [19]
Duret

[11] Patent Number: 4,550,937
[45] Date of Patent: Nov. 5, 1985

[54] JOINT FOR STEEL TUBES

[75] Inventor: Jean Duret, Aulnoye-Aymeries, France

[73] Assignee: Vallourec S.A., Paris, France

[21] Appl. No.: 102,135

[22] Filed: Dec. 10, 1979

Related U.S. Application Data

[63] Continuation of Ser. No. 881,259, Feb. 27, 1978, abandoned, which is a continuation-in-part of Ser. No. 583,831, Jun. 4, 1975, abandoned, which is a continuation-in-part of Ser. No. 370,146, Jun. 14, 1973, abandoned.

[51] Int. Cl.$^4$ ............................................. F16L 25/00
[52] U.S. Cl. ..................................... 285/334; 285/114; 285/355; 285/383; 29/434; 29/525
[58] Field of Search ............... 285/334, 333, 390, 355, 285/383, DIG. 16, 94, 417; 29/434, 525

[56] References Cited

U.S. PATENT DOCUMENTS

| | | | |
|---|---|---|---|
| 2,051,499 | 8/1936 | Siegle | 285/383 X |
| 3,059,697 | 10/1962 | Pitts | 285/DIG. 16 |
| 3,146,142 | 8/1964 | Maly | 285/DIG. 16 |
| 3,489,437 | 1/1970 | Duret | 285/334 X |

FOREIGN PATENT DOCUMENTS 1224136  3/1971  United Kingdom ............... 285/334

OTHER PUBLICATIONS

The Brittleness of Steel; M. Szczepinski; John Wiley and Sons, 1963, pp. 187–199.

Primary Examiner—Dave W. Arola
Attorney, Agent, or Firm—Arnold, White & Durkee

[57] ABSTRACT

Threaded pipe joint in which tip of the male member engages shoulder within the female member and any excess in the outer diameter of the male member over the corresponding inner diameter of the female member is so small that the hoop stress in the female member does not exceed the axial stress therein.

16 Claims, 7 Drawing Figures

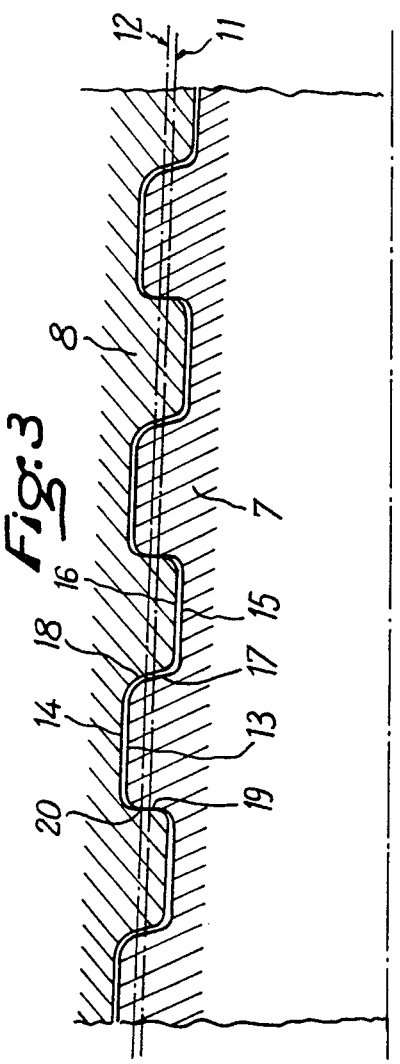
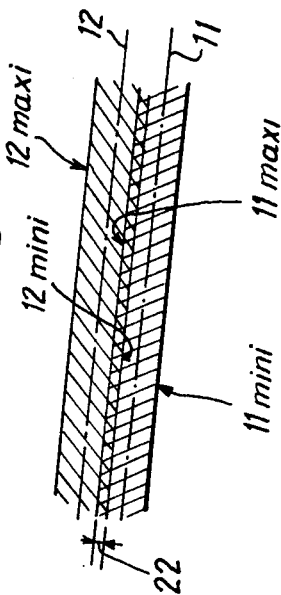
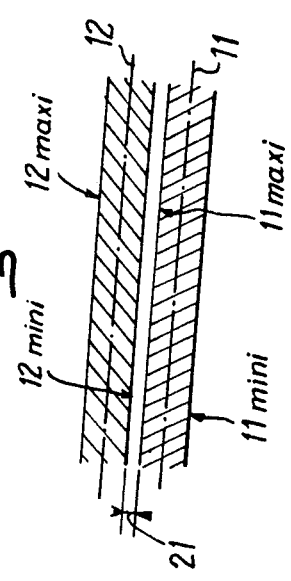

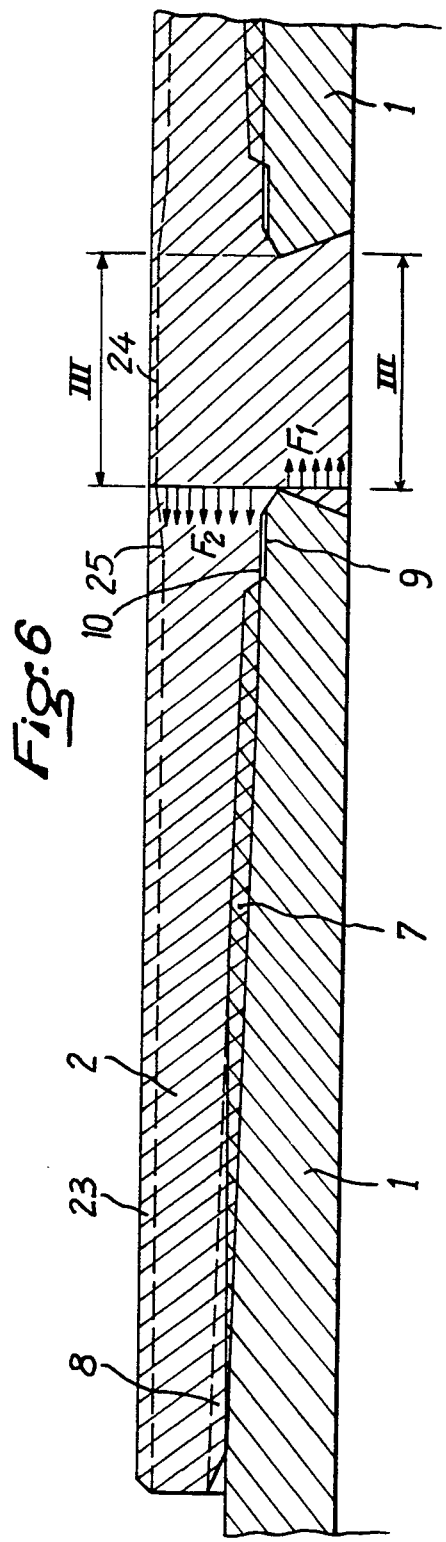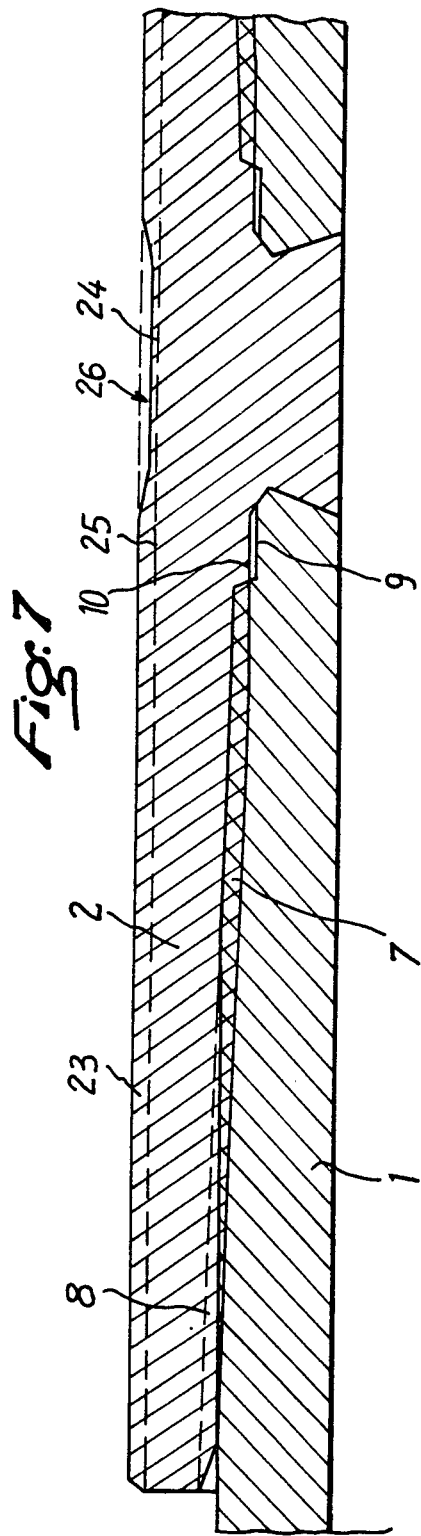

JOINT FOR STEEL TUBES

This ia a continuation, of application Ser. No. 881,259, filed Feb. 27, 1978, which was a continuation-in-part of Ser. No. 583,831, filed June 4, 1975, which was a continuation-in-part of Ser. No. 370,146, filed June 14, 1973 all now abandoned.

The present invention refers to a joint for steel tubes, intended in particular to be employed in the petroleum industry, which exhibits the special feature of being not very sensitive to the phenomenon of embrittlement by hydrogen.

Joints for steel tubes intended for the petroleum industry are already known, of the type in which assembly is effected by means of a thread produced on a frustoconical surface at the tip of the male member, which engages with a theard of corresponding form produced on the frustoconical surface of the inner surface of the tip of the female member. In an embodiment of this type of joint tightness is ensured by the fact that the tip of the male member comes to abut against a shoulder of corresponding shape located at the end of the theard on the female member, the said shoulder consisting in its central zone of a frustoconical surface the crown of which points towards the tip of the female member, and in its peripheral zone of an abutment surface, for example, frustoconical, the taper of which points in the reserve direction, so that when the tip of the male member comes to abut against the shoulder on the female member the central zone of the shoulder has the tendency to force the tip of the male member back towards the outside, whilst the peripheral zone of the shoulder acts in the reverse direction.

In this known type of joint the relative dimensions of the threaded frustoconical portions are such that during assembly there is produced ferruling of the threaded male portion against the threaded female portion, whilst the tip of the male member comes to abut against the shoulder on the female member in order to ensure tightness of the joint.

This joint gives every satisfaction in current employment and it is not particulary sensitive to the phenomenon of embrittlement by hydrogen when the acid embrittling fluid circulates inside the joint as is the case in the greatest number of cases.

In fact the tip of the male member as well as the portion of the female member which lies in the vicinity of the shoulder forming the abutment are subjected solely to bi- or tridimensional compression stresses which oppose cracking by embrittlement by hydrogen.

On the other hand, when the acid embrittling fluid circulates outside a joint of the type of those which have just been described, there is a risk of fairly rapid embrittlement which leads to bursting of the part which bears the female thread.

The phenomenon can be explained by the fact that the portion of the female member which has the frustoconical thread gets subjected during assembly and still more under the service conditions of the joint to perpendicular tension stresses.

In fact the portion carrying the female thread gets first of all subjected to longitudinal tension to balance the force exerted by the tip of the male member against the internal shoulder on the female member. Furthermore the ferruling which is exerted during the scewing together of the two frustoconical threads exerts forces of elongation upon the periphery of the female member in directions perpendicular to the axis of the joint.

The stresses in service such as the axial tension on the tubes due to the suspended weight and the possible internal overpressure of the flowing medium increase still more the assembly stresses. In addition, because of the variations in thickness due to the mechanical necessities of production localized stress concentration zones are observed, which may increase the said stresses considerably.

This combination of two elongative stresses arranged perpendiculary is very favourable to the phenomenon of embrittlement by hydrogen.

An object of the present invention is to avoid this disavantage and to enable a resistance to hydrogen embrittlement which is as good outside and inside of the joint.

Another object of the present invention is to enable a resistance to hydrogen embrittlement which is at least as good in all parts of the joint as in the tubes being secured together by the joint.

Another object of the present invention is the new industrial product which consists of a joint for steel tubes, employable paticularly in the petroleum industry, capable of being assembled and dismantled, of the type in which the tightness is obtained by the fact that the tip of the male member comes to abut against a shoulder produced inside the female member, the said shoulder comprising a central zone in the shape of a truncated cone the crown of which points towards the tip of the female member and a peripheral zone having a shape like a truncated cone the taper of which points in the opposite direction, the tip of the male member having a shape like that of the central zone forming the abutment of the shoulder on the female member, and a shape identical with or adapting itself to the shape of the peripheral zone of the shoulder on the female member, the assembly of the male member and the female member being effected by the threads of corresponding shape, produced on a frustoconical surface inside the tip of the female member and on a frustoconical surface on the outside of the male member, characterized by the fact that the relative dimensions of the frustoconical threads on the male member and the female member are such that during assembly of the joint no excessive ferruling of the female member onto the male member is produced.

In accordance with the invention and for a metal selected of an ordinary or special anti-embrittling quality the stress theresholds not to be exceeded in service are defined and the concept of the joint must be such that at no point on either of the members male and/or female are these maximum stresses exceeded, not only after screwing up but also under service conditions.

Said stress thresholds are preferably at least equal to the stress thresholds in the tubes which, when overrun, would cause hydrogen embrittlement of the tubes and damage said tubes.

Also object of the present invention is the new industrial product which consists of a variant upon the joint which has just been defined above, this variant being characterized by the fact that the assembly of the male member and the female member is effected by means of cylindrical threads ending possibly in a portion of frustoconical thread in the direction opposite to the tip of the male member or in the direction of the tip of the female member.

In this variant likewise the cylindrical threads and possibly the frustoconical threads have dimensions such that during assembly of the joint no significant ferruling of the female member onto the male member is produced.

When it is pointed out that in accordance with the invention no significant ferruling of the female member onto the joint is produced during assembly of the joint it is understood by that that in the position of abutment of the tip of the male member against the shoulder on the female member the diameters of the tops and bottoms of the threads on the male member are not systematically greater than those of the bottoms and tops of the threads on the female member. (The dimensions being of course measured before assembly, because after assembly the ferruling or the dilation of the male member by the internal overpressure can have the effect of making these dimensions equal).

In the other words the theoretical dimensions of the thread on the male member and the thread on the female member are such that in spite of machining tolerances the largest possible diameters of the male member remain less than the smallest possible diameters of the female members, or else that the largest possible diameters of the male member are only slightly greater than the smallest possible diameters of the female member.

In the latter case a deliberately limited reduced partial ferruling is obtained which is only produced in the case in which there has been produced at statistical random a maximum diameter of the male member and a minimum diameter of the female member.

Said ferruling is reduced enough to not cause in the male and female members stresses exceeding the above mentioned stress thresholds.

In the case where the inner diameter of the female thread is larger than the outer diameter of the male thread a theoretical clearance is produced between said threads. According to the invention the largest possible theroretical clearance is such that the deformations which occur in the male and female members, under service conditions, will not cause therein stresses exceeding the above mentionned stress thresholds.

By way of example for a tube of about 100 millimeters diameter, when at any point the difference between the largest and smallest possible diameters of the male member or the female member is two tenths of a millimeter the machining dimensions can be determined so that the largest possible diameter of the male member is greater at most by about a tenth of a millimeter (for example, a few hundredths of a millimeter) than the minimum possible diameter of the female member.

Furthermore, in accordance with the invention, when that is the case it is preferable that the minimum possible diameter of the female member exceed by only a small amount (for example, less than 5 hundredths of a millimeter) the maximum possible diameter of the male member.

In another example, for a tube of about 100 millimeters outer diameter and at least 5 millimeters thickness the maximum possible diameter of the male member is 0.15 mm (and preferably no more than 0.12 mm) greater than the minimum possible diameter of the female member and the minimum possible diameter of the male member is 0.20 mm (and preferably no more than 0.18 mm) lesser than the maximum possible diameter of the female member, the diameter range due to machine tolerances being at most equal to 0.25 mm but being preferably at most equal to 0.23 mm for the male members and to 0.12 mm for the female members.

If the maximum diameter differences between male and female members are, as above mentioned, of +0.12 mm and −0.18, the diameter ranges for male and female members are preferably respectively of 0.19 mm and 0.11 mm.

The differences of dimension indicated above many vary in a manner which is substantially proportional to the diameter of the tube.

Because during screwing up little or no ferruling is exerted by the female thread on the male, the torque resisting the assembly torque is essentially due to the torque necessary for fitting the tip of the male member against the shoulder in the female member.

Both when the thread is totally conical and when it is cylindro-conical, the taper of the male member or the pitch of its thread may be deliberately differentiated from those of the female member, taking into account tolerances of production of the diameters of the threads, in order to control the possibilities of ferruling or diametral clearance in a different manner along the thread conical length. In fact since the machining of conical threads on cylindrical tubes produces variable thicknesses and variable rigidities connected with these thicknesses there can result variable transverse and longitudinal stresses the keeping of which below the maxima predetermined by the steel may necessitate a differentiation in the clearances or variations in the dimensions along the conical thread.

In this way one can determine with greater precision the tightening torque which must be applied during assembly.

This torque must be as small as possible in order to reduce the stresses but it must at the same time be sufficient for the tip of the male member to remain fitted with a certain force against the shoulder on the female member when the tube is subjected as a whole to longitudinal tension such as that which results from gravity when a column of tubes is hung vertically in a well.

In accordance with the invention it is preferable for the case of an abnormal excessive tightening of the joint to see to it that in the right section of the joint at the level of the abutment the section of the female member has an area of about 10 to 20% greater than the area of section of the male member. The result of this is that in the case of excessive tightening only the tip of the male member and the abutment on the female member undergo permanent deformations.

The lateral clearance which is produced in accordance with the invention between the threads on the male member and those on the female member likewise offers the advantage of enabling better centering of the tip of the male member in the shoulder on the female member and thus in spite of the machining tolerances and the defects in alignment which result therefrom, of obtaining excellent tightness in all cases, as well as the most uniform possible distribution of the stresses set up in the female member by the thrust of the abutment surfaces.

It is understood that thanks to the characteristics of the joint in accordance with the invention the threaded portion of the female member is subjected only to transverse tensional stresses systematically limited below predetermined maximum values which are selected in accordance with the metal employed.

On the other hand when the joint is subjected to longitudinal tension as, for example, under the conditions which have just been called to mind above, the force of elongation which the male portion exerts on the female portion causes a phenomenon of constriction which tends to reduce the diameter of the female portion whilst creating at the periphery of the latter forces of compression (that is to say, forces which act in direction the reverse of the forces caused by ferruling).

It is understood under these conditions that the female member which is subjected only to forces of elongation deliberately limited as a function of the metal employed (and this both in the longitudinal sense and in the transverse sense) can resist in a satisfactory manner the phenomenon of embrittlement by hydrogen.

In certain usages it can even be imagined that during screwing up (and of course before being put into service with suspended weight and internal overpressure) the bidirectional stresses in the female member are practically nil provided that the result is not increased risk for the male member.

In accordance with a preferred embodiment of the invention a slight lateral clearance is allowed to persist between the portion of the male member located between its tip and the start of its thread, and the corresponding portion of the female member.

In this way there is obtained a better distribution of the stresses at the outside periphery of the female member as will be explained later.

In accordance with another special embodiment of the joint in accordance with the invention, there is effected on the outside of the female member a slight progressive diminution of the diameter at right angles to the portion of the female member which is located beyond the shoulder.

As will be explained later where there is likewise obtained in this way a better distribution of the stresses at the periphery of the female member.

The thrust of the biconical tip of the male member against the female abutment is acting outside of the medium female steel thickness and therefore said thrust causes on said thickness both a global tensile action and a bending action. Said bending action causes a convex bending of the female member and thus an increasing of the biaxial stresses in the outer surface of said convex bended zone. According to the invention the convex wave on the outer surface is reduced by increasing the transverse female section by at least 10% as above mentioned and by increasing the axial length of the female abutment. Preferably the lenght of the abutment is ranging between 15 to 20 mm and accordingly if a sleeve with two abutments is used the distance between said abutments is at least of 30 to 40 mm.

Said distance is preferably at least equal to 2.2 times the thickness of the sleeve between the two shoulders.

In both cases the axial length of the abutment must be greater the thinner the tube for a given diameter.

According to a particular improvement of the invention the dimensions of the male member and of the female member are such that the tip of the male member is radially compressed by the peripheral zone of the female abutment and axially compressed by said abutment, providing there by in the tip biaxial compressive stresses which enhance resistance to embrittlment. Due to the absence of ferruling of the male thread by the female thread the radial compression of the male member by said peripheral zone is allowed to cause compressive stresses not only in the tip but also in the male threaded part. Further internal high pressure in the pipe may not diametrally distend the tip as much as the tube in despite of the fact that the tip is thinner than the tube, owing to the fact that the sum of thickness of male tip and corresponding female zone exceeds that of the tube.

In order to achieve said improvement in despite of the machining tolerances, for a joint of about 101 mm outer male diameter, the median diameter of said peripheral zone is for example between 95.4 and 95.25 mm and the corresponding median diameter of the external male tip shape is between 95.6 and 95.75 mm, the essential feature being a tolerance range of 0.15 mm for a diameter difference of 0.2 mm between male and female members.

In accordance with another special embodiment of the invention assembly of the joint is effected by applying only a very low screwing-up torque which sets up only very low assembly stresses but which could be insufficient to maintain assembly when the joint is subjected to longitudinal tension in service, during putting in place of the column of assembled tubes or during its withdrawal before dismantling, and this disadvantage is compensated by employing for effecting the assembly a polymerizable lubricant which hardens a certain time after being put in place, forming an adhesive.

Such a polymerizable lubricant must have chemical neutrality towards the agents circulating in and around the assembly. It must also have sufficient resistance to the pressures and temperatures at which the joint is employed. Finally it must enable unscrewing of the joint without damaging the members of the latter.

With this object polymerizable lubricants may be employed such as epoxy resins or urethanes charged with anti-seizing and anti-friction solids, plasticiser products enabling their mechanical characteristics to be adjusted and catalyst products for regulating the required polymerization conditions.

One can thus obtain a low-strength solid product capable of being destroyed during unscrewing without damaging the steel of the two assembled members.

In accordance with another special embodiment of the invention the polymerizable lubricant is employed as a filling agent for the diametral clearance between the male member and the female member, in order that after hardening the disappearance of this clearance prevents one of the members from undergoing alone a deformation without the outer member being concerned.

For example, for a joint of very small dimensions for which the state of machine-tool technique does not enable sufficiently close tolerances to be effected the risk of excessive clearance may be chosen rather than that of excessive ferruling, the excessive clearance being then nullified by a polymerisable lubricant of a strength adapted to this use.

Joints in accordance with the invention may be of the type in which the tip of a tubular member is shaped as a male member whereas the tip of the other tubular member is shaped as a female member.

However, the invention is particularly interesting to apply in the case in which the male tips of two tubular members are joined by means of a double female threaded sleeve.

With one object of making the invention better understood a number of embodiments will now be described by way of illustration and without any restrictive character, as illustrated in the attached drawing.

Figure 2:
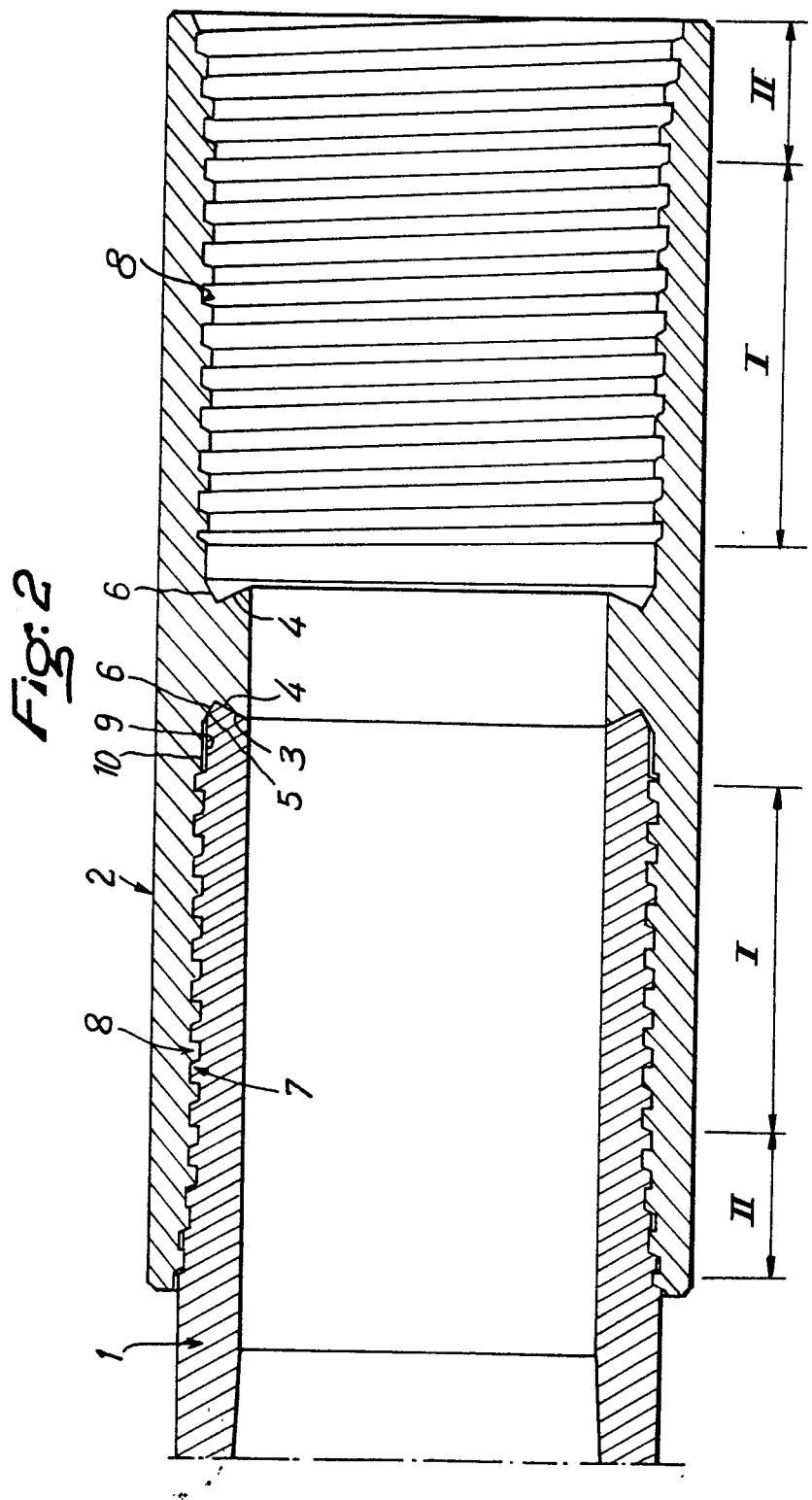

In this drawing:

FIG. 1 is a diagrammatic axial section of a joint in accordance with the invention, including frustoconical threads, FIG. 2 is a variant upon the joint as FIG. 1, in which assembly is effected by means of cylindro-conical threads, FIG. 3 is a diagrammatic view illustrating the clearance existing in a joint in accordance with the invention between the thread on the male member and the thread on the female member, FIGS. 4 and 5 show diagrammatically how the distributions of the machining tolerances are to be arranged on the male member and on the female member, FIG. 6 is a diagrammatic view on a larger scale showing the deformations which the female member undergoes when a longitudinal tension is exerted on the joint, FIG. 7 shows diagrammatically a variant in accordance with the invention which enables the stresses to be better distributed at the outside periphery of the female member.

In FIG. 1 there is illustrated diagrammatically in section a joint in accordance with the invention comprising the tip of a male member 1 onto which has been screwed a tubular sleeve 2. The righthand portion of the tubular sleeve does not include the other male member which is to come and engage with it.

As is already known, the tip of the male member has a frustoconical surface 3 which comes to bear against a shoulder 4 of corresponding shape on the sleeve 2 and of which the main purpose is to ensure limitation of the screwing up.

On the outside periphery of the tip of the member 1 is a surface 5 of, for example, frustoconical shape which during tightening comes to bear against a surface 6 on the sleeve 2 of corresponding or substantially corresponding shape.

In a preferred embodiment of the invention, for a pipe 1 having a diameter about 100 mm the middle diameter of surface 5 is about 0.2 mm greater than the corresponding diameter of surface 6 with machines tolerances of about 15 mm. For example diameter in the middle of surface 5 is between about 95.6 and 95.75 mm and corresponding diameter of surface 6 is between about 95.4 and 95.25 mm.

There is likewise seen in FIG. 1 how the frustoconical thread 7 on the male member engages with the frustoconical thread 8 of corresponding shape which is produced on the female member.

Again on FIG. 1 is seen how the surface 9 and 10 which join the ends of the threads on the one hand to the tip of the male member and on the other hand to the shoulder on the female sleeve leave between them a slight clearance in accordance with a preferred embodiment of the invention.

During tightening of the joint limitation of the screwing up is determined by the bearing of the tip of the male member against the surfaces 4 and 6 on the female member.

The action of the surface 3 of the male member against the zone 4 of the shoulder on the female member has the effect of throwing outwards the tip of the male member the surface 5 of which bears against the surface 6 on the female member to ensure tightness of the joint.

The angle of the generatrix of the surface 4 with respect to the plane perpendicular to the axis of the joint must be greater than the angle of slip of the tip of the male member against the shoulder on the female member. This angle is for example between 10° and 30° and is preferably selected between 15° and 20°.

The slope and the shape of the surfaces 5 and 6 may vary within wide limits on the sole condition of enabling tightness of the joint to be affected by elastic and/or plastic deformation of the surface 5 against the surface 6.

In FIG. 2 is illustrated a variant upon the joint illustrated in FIG. 1.

In this variant the threads 7 and 8 on the male and female members instead of being produced on a frustum of a cone are produced for the greater part on a cylindrical surface 1 and in the embodiment illustrated, likewise on a frustoconical surface II which is located in the vicinity of the tip of the female sleeve.

As may be seen in FIG. 2 the cylindrical portion of the threads is the more important. In a variant the frustoconical portion could possibly be eliminated although this frustoconical portion enables more rational employment of the metal by making use of threads the height of which is progressively reduced in the direction of the tube constituting the male member.

A portion of the threads on the male member 7 and the female member 8 is illustrated diagrammatically in section on a larger scale in FIG. 3.

In order to satisfy the necessity for a radial clearance which is one of the main characteristics of the present invention the frustoconical generatrix 11 of the thread 7 on the male member is located below the frustoconical generatrix 12 of the thread 8 on the female member so as to allow a mean clearance which corresponds with the spacing between the generatrices 11 and 12 to persist between the two threads.

It is seen in fact that the tops 13 of the threads on the male member 7 are at a diameter smaller than that of the grooves 14 of the threads on the female member 8. The same goes for the grooves 15 of the threads on the male member 7 and the tops of the threads on the female member 8.

Similarly the rear faces 17 and 18 leave a clearance between them and screwing up and assembly are ensured solely by the action of the front faces 19 and 20 of the male threads and female threads.

It can be seen that under these conditions assembly of the joint causes no ferruling of the female member 8 onto the male member 7.

In order to let it be better understood how the clearance between the male threads and female threads must be produced two possible cases have been illustrated diagrammatically in FIGS. 4 and 5 for the distribution of the manufacturing tolerances.

In these two Figures are shown the frustoconical generatrix 11 of the thread on the male member and the frustoconical generatrix 12 of the thread on the female member.

The lines 11 and 12 correspond with the theoretical positions of the male and female threads.

In practice however, it is impossible to produce threads strictly in the position in which they should be.

Thus there is illustrated between the lines "11 mini" and "11 maxi" the variations in positioning of the generatrix 11 due to manufacturing tolerances.

Thus, in words other, when theoretically the male thread must be determined by the generatrix 11, the latter is located in practice and as a function of the chances of machining, between the generatrix "11 mini" and the generatrix "11 maxi". The same goes for the generatrix 12.

In the case of FIG. 4, the theoretical positioning of the generatrices 11 and 12 has been chosen so that the "12 mini" dimensions are always greater than the "11 maxi" dimensions. The result is that one thus obtains a compulsory clearance over the whole of the points on the male and female threads. The minimum amount of this clearance is shown by the distance 21.

In accordance with the invention it is preferable to select this clearance 21 to be of small amount and if possible to select it close to zero.

FIG. 5 illustrates the case in which the dimensions of the generatrix "11 mini" have been selected greater than the dimensions of the generatrix "12 mini", whence results an interpenetration of the domains of manufacturing tolerance by a slight distance which is shown by 22 in FIG. 5.

It will be understood that in the case of FIG. 5 a clearance exists between the male thread and the female thread at all points, constituting a great majority, at which the effective production of the generatrix 11 is located below the effective production of the generatrix 12.

In practice, by admitting a slight interpenetration of the zones of machining tolerance screwing-up is effected without appreciable ferruling or with a very much reduced ferruling which does not thwart the ends sought by the present invention.

By way of example, if the machining tolerances radially are of the order of 1 tenth of a millimeter (distance between "11 mini" and "11 maxi" or between "12 maxi") the interpenetration of the zones of machining tolerance which corresponds with the distance 22 may be, for example, a few hundredths of a millimeter.

If the machining tolerances radially are for example 0.19 mm for the male members (distance between "11 mini" and "11 maxi") and 0.11 mm for the female members (distance between "12 mini" and "12 maxi") the distance 22 is 0.12 mm and the maximum clearance (distance between "11 mini" and "12 maxi") is 0.18 mm.

In FIG. 6 there is illustrated diagrammatically the stresses which are exerted when two male members 1 are assembled into a tubular sleeve 2 and an axial tensile force is exerted on the joint assembly, for example, by tension along the male members. Such tension may be produced in practice by hanging the tube in a well.

It will be observed that during tightening of the joint there is exerted in the central portion 3 of the sleeve on the one hand a series of forces F1 which are compressive forces and which are located at the internal periphery of the sleeve, and on the other hand a series of forces F2 which are tensile forces and which are located at the outside periphery of the sleeve.

Is is the equilibrium of these forces which ensures assembly of the joint.

When this joint is subjected progressively to axial tensile forces exerted on the male members it is understood that the forces F1 diminish progressively whilst the forces F2 increase so as to be able to oppose the longitudinal tensile forces.

In accordance with the invention it is preferable in principle that the forces F1 always remain present in order to ensure tightness.

The existence of the forces F2 which occur over the whole length of the sleeve and in particular up to the lefthand tip of the latter (as seen in FIG. 6), have the effect of producing a slight constriction of the sleeve, that is to say, a reduction in its diameter, which is effected the more easily since in accordance with the invention, a clearance has been produced between the thread on the male member and that on the female member.

This constriction of the metal has the object of causing to appear at the periphery of the sleeve light compressive forces arranged perpendicular to the axis of the tube.

The deformation which results from this constriction has been represented in broken line in the vicinity of the outside of the sleeve. Of course this deformation has been considerably exaggerated in order to enable better understanding.

It will be observed that at the tips of the sleeve and over a fairly long distance one has a reduction in diameter which is substantially constant as represented by the line 23. On the other hand at the level of the central zone 3 of the sleeve the reduction in diameter represented by the line 24 is of much smaller amount because this portion of the sleeve is much thicker and it is compressed by the pressure against the abutment (forces F1) and can consequently effectively resist the contrictive action.

Finally it will be observed that the line 23 joins up with the line 24 by a line 25 having a point of inflection.

It is at the level of this line 25 having a point of inflection that points might possibly occur at the surface of the sleeve at which a slight tensile stress exists in a direction perpendicular to the axis of the joint.

In order to reduce the possibility of encountering such tensile stresses which are harmful to good resistance to embrittlement by hydrogen it is preferable in accordance with a special embodiment of the invention to provide a clearance between the surfaces 9 and 10 so as to enable good distribution of the stresses between the central zone 3 of the sleeve and the zone which bears the threads. In this way the creation is facilitated of a kind of rounding on the outside of the sleeve due to possible pivoting of the metal about the outside edge of the male member.

It will be observed furthermore that this good distribution of the stresses on the outside of the female member is the more easy to obtain the more the forces F1 are reduced. This is the reason why it is preferable to reduce to a minimum the tightening torque.

In FIG. 7 a variant is illustrated which enables avoidance to a large degree of the curve 25 having a point of inflection at the outside of the sleeve subjected to longitudinal tension.

With this object, on the outside of the zone 3 of the sleeve a slight throat 26 is produced, which connects progressively with the outside of the sleeve.

Having thus weakened the central portion of the sleeve one counterbalances the deformation which is due to the thickening of this central portion of the sleeve.

Due to that, lines of deformation 23, 24 and 25 can be obtained which are substantially aligned in the case of a longitudinal tension in the tubes which are thus assembled.

In this way one arranges that at no point on the outside of the sleeve is encountered a superconcentration of stress through change of shape, greater than the mean tensile stresses in the thickness considered, which have been controlled by the arrangements in accordance with the invention.

In accordance with a preferred variant upon the invention the sleeve in FIG. 1 is produced in such a way that the distance between the two shoulders 4 on the sleeve is equal to at least 2.2 times the thickness of the sleeve 2 between the shoulders 4. In this way a very favourable distribution of the stresses in the sleeve is obtained.

In the case of a joint without a sleeve the female member advantageously has a shoulder 4 which is extended axially along a cylindrical surface of a length at least equal to 1.1 times the total thickness of the female member at the level of the shoulder.

In another variant upon the invention it is possible to improve the distribution of the stresses on the outside of the female member by employing a joint tightening torque which is very much reduced and which would be insufficient to ensure of itself alone the tightness of the joint when the latter is subjected to longitudinal tension. In this case for effecting the assembly a polymerizable lubricant is employed, which through hardening ensures adhesion of the joint, avoiding its coming unscrewed in service and reinforcing its tightness. Preferably this lubricant must enable unscrewing of the joint under deterioration of the metal.

Of course the embodiments which have been described above display no restrictive character and they could receive any desirable modifications without thereby departing from the scope of the invention.

What we claim is:

1. An oil well pipe joint resistant to embrittlement by corrosive oil well fluids comprising a male pipe member and a female pipe member having mating threads of trapezoidal section adapted to be repeatedly assembled and disassembled, said female member having an internal shoulder and an external surface, said male member having a tip and a seal being formed between said shoulder and said tip, said shoulder defining an annular recess having a radially inner side in the shape of a truncated cone the largest diameter of which is at the bottom of the recess, and an outer side having the shape of a truncated cone the smallest diameter of which is at the bottom of said recess, the tip of said male member terminating in surfaces having substantially the same conicity as the inner and outer sides of said recess, and mating frusto-conical threaded sections inside the end of said female member and on the outside of the end of said male member, the nominal radial dimensions of the threads on said sections being such that when said joint is fully made up there is a nominal radial clearance between each threaded part of the male member and the corresponding threaded part of the female member, the said nominal radial dimensions being chosen such that with the applicable tolerances the maximum clearance between the threads on the male member and the corresponding threads on the female member is 0.3 mm per 100 mm of pipe diameter and the instances of interference are sufficiently minimal to avoid substantial hoop stresses in the female member, whereby said external surface of said female member and said internal surface of said male member are highly resistant to corrosion embrittlement in use in an oil well.

2. An oil well pipe joint according to claim 1, wherein the maximum extent of said interference is 0.1 mm for each 100 mm of the diameter of the pipes.

3. An oil well pipe joint according to claim 1, wherein the maximum extent of said slight interference is 0.12 mm, and the maximum extent of said slight clearance is 0.18 mm.

4. A joint as claimed in claim 1, in which the threads hold the tip of the male member against the shoulder on the female member with sufficient force for the tip of the male member to remain seated against said shoulder in spite of any axial forces to which the joint is subjected in the course of use.

5. A joint as claimed in claim 1, in which a slight lateral clearance is provided between an unthreaded portion of the male member located between its tip and its threaded portion, and the corresponding portion of the female member.

6. A joint as claimed in claim 1, comprising a polymerized sealing lubricant between said male and female member.

7. A joint as claimed in claim 1, which comprises two pipe sections the tips of which are formed into male members and which are connected together by a single tubular sleeve defining two female members each having a shoulder.

8. A joint as claimed in claim 7, in which the distance between the two shoulders on the sleeve is at least equal to 2.2 times the thickness of the sleeve between the shoulders.

9. A joint as claimed in claim 7, in which the distance between the shoulders on the sleeve is at least equal to 30 mm.

10. A joint as claimed in claim 1, in which at the tip of the male member the right section of the female member has an area about 10 to 20% larger that that of the male member.

11. A joint as claimed in claim 1, in which the shoulder on the female member has an axial length equal to at least 1.1 times the total thickness of the female member at the shoulder.

12. A joint as claimed in claim 1, in which the shoulder on the female member has an axial length equal to at least 15 mm.

13. A joint as claimed in claim 1, wherein the diameter of the outer conical surface of said tip of the male member is slightly greater than the diameter of said outer side of the female member.

14. A joint as claimed in claim 13, wherein, for a pipe outer diameter of about 100 mm the diameter of said tip is between 95.6 and 95.97 mm and the diameter of said outer side is between 95.4 and 95.25 mm.

15. A method of making a corrosion embrittlement resistant joint for steel oil well pipes comprising a male pipe member and a female pipe member adapted to be repeatedly assembled and disassembled, said female member having an internal shoulder, and an external surface and a seal being formed between siad shoulder and the tip of the male member, said shoulder defining an annular recess having a radially inner side in the shape of a truncated cone the largest diameter of which is at the bottom of the recess, and an outer side having the shape of a truncated cone the smallest diameter of which is at the bottom of said recess, the tip of said male member terminating in surfaces having substantially the same conicity as the inner and outer sides of said recess, and mating frusto-conical threaded sections inside the end of the female member and on the outside of the end of the male member, which method comprises the step of machining said members and threaded sections so that the radial fit between any threaded part of the male member with respect to a corresponding threaded part of the female member is in the range between a slight radial interference and a slight radial clearance, the maximum extent of said slight radial interference not exceeding 0.1 mm for each 100 mm of the pipe diameter and the maximum extent of said radial clearance not exceeding 0.3 mm for each 100 mm of pipe diameter, so that said external surface of said female member and the internal surface of said male member are highly resistant to corrosion embrittlement.

16. A method according to claim 15, wherein said step of forming comprises, machining the threaded section of the male member within a tolerance of 0.19 mm and the female member within a tolerance of 0.11 mm for each 100 mm of pipe diameter, so that the maximum extent of said interference is 0.12 mm, and the maximuum extent of said clearance is 0.18 mm.

* * * * *